United States Patent [19]

Volna

[11] 4,202,321
[45] May 13, 1980

[54] SOLAR TRACKING DEVICE

[76] Inventor: William M. Volna, 3501 Coolidge St., N.E., Minneapolis, Minn. 55418

[21] Appl. No.: 910,669

[22] Filed: May 30, 1978

[51] Int. Cl.$^2$ ............................................. F24J 3/02
[52] U.S. Cl. ...................................... 126/425; 353/3; 74/86
[58] Field of Search ............... 126/270, 271, 424, 425; 237/1 A; 250/203 R; 74/86, 70, 22 R, 23, 1; 353/3; 350/83

[56] References Cited

U.S. PATENT DOCUMENTS

| | | | |
|---|---|---|---|
| 326,711 | 9/1885 | Braune | 353/3 |
| 507,999 | 11/1893 | Davis | 353/3 |
| 722,095 | 3/1903 | Geer | 74/70 |
| 913,051 | 2/1909 | Pope | 126/270 X |
| 1,642,545 | 9/1927 | Harvey | 353/3 |
| 2,646,720 | 7/1953 | Poliansky | 353/3 |
| 2,699,502 | 1/1955 | Hohl | 74/86 |

Primary Examiner—Carroll B. Dority, Jr.
Assistant Examiner—Lee E. Barrett
Attorney, Agent, or Firm—Paul L. Sjoquist

[57] ABSTRACT

Apparatus for directing a pointing axis at the position of the sun, and for tracking the relative motion of the sun from an observation point on earth from horizon to horizon with a single, constant speed driving mechanism. The apparatus comprises a first member aligned along the local vertical axis, a second member aligned along an intersecting polar axis, a rotatable shaft member which is pivotal in a horizontal plane about the intersection point of the vertical and polar axes, a number rotatable about the polar axis along a circular path about the intersecting point of the two axes, and a solar pointing member fixedly attached to the rotatable shaft member at the point of intersection of the foregoing two axes and movably attached to the member which is rotatable about the polar axis member, wherein the constant speed drive mechanism is coupled to the polar axis member for rotating said member about the polar axis. When the pointing member is initially adjustably set to point toward the sun, the constant speed drive mechanism will thereafter cause the pointing member to continually track the movement of the sun relative to the earth from horizon to horizon.

13 Claims, 10 Drawing Figures

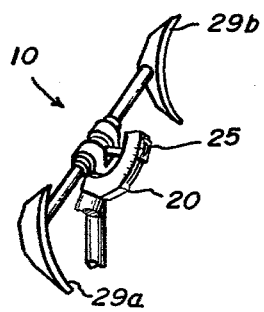
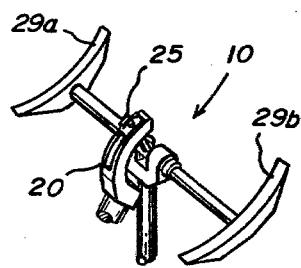
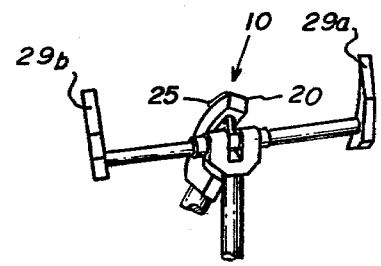
FIG. 2A  FIG. 2B  FIG. 2C
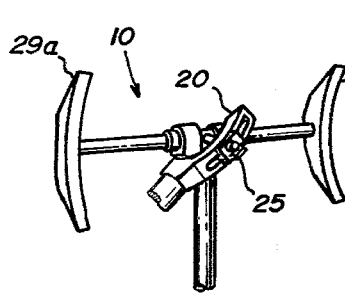
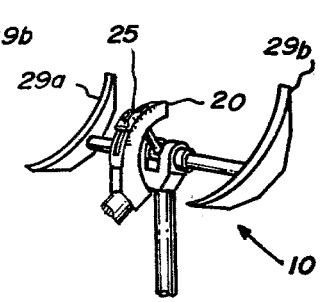
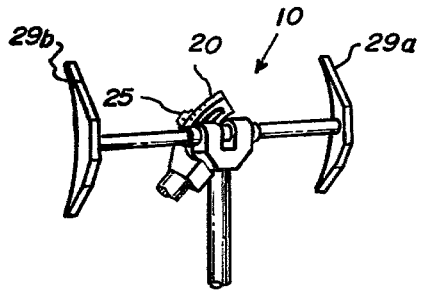
FIG. 3A  FIG. 3B  FIG. 3C
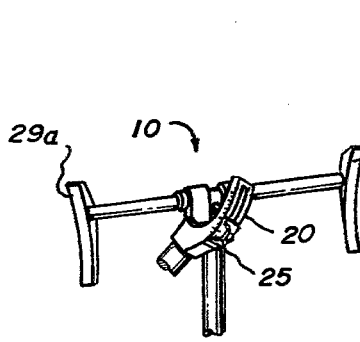
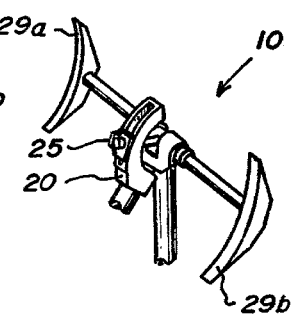
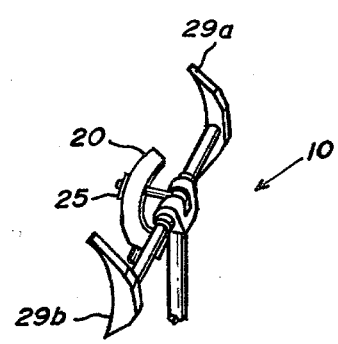
FIG. 4A  FIG. 4B  FIG. 4C

SOLAR TRACKING DEVICE

BACKGROUND OF THE INVENTION

This invention relates to a solar tracking device, and more particularly to a solar tracking device which operates under the control of a constant speed drive mechanism to cause a solar pointing axis to track the movement of the sun as it moves across the earth's sky. The invention further relates to a solar energy collection system which may be optimally positioned for collecting maximum solar energy at any time during the day.

Solar tracking devices in the prior art have taken a number of approaches for directionally tracking the sun. One method, used in most astronomical telescopes, is referred to as a polar mount, and has two axes of freedom. The first axis, commonly called the polar axis, is typically carried by coaxially aligned bearings on two piers or towers of dissimilar height that lie in the plane of the earth's spin axis. The height of the towers is adjusted to cause this polar axis to point at the earth's celestial pole. The second axis of freedom on this type of device is attached orthogonally to the polar axis. Typically, a payload such as a telescope or solar collector, is attached to the orthogonal axis. Once the device is set to the appropriate declination of the celestial object to be tracked, it is driven by only the polar axis in order to remain aligned. This mounting method and approach is eminently successful for observatory instruments, but impractical for solar energy collection. When a large, flat rectangular solar array is placed on a polar mount, the two support towers must be unnecessarily tall. This is essential in order to avoid ground interference when the array is pointed east and west. The increased height creates architectural and structural problems and significantly adds to the cost of material and installation. The singular advantage of a polar mount for solar energy collection is that only the polar axis need be driven at a constant rate of one revolution per solar day in order to accurately track the sun.

A second method for directing a solar array at the sun is commonly achieved with what is called altazimuth mounting. This mounting also has two degrees of freedom. The solar array, or solar energy collecting device, is attached to the first (altitude) axis. This axis normally lies in a horizontal plane and it permits the solar array to be moved vertically to the proper elevation angle of the sun at any particular time. The second axis of the altazimuth mounting carries both the elevation axis and solar array about a locally vertical axis. For a given moment in time, the azimuth axis must be moved to the proper azimuth angle of the sun. This type of mounting is typically found in a surveyor's transit or naval gun mount, and the mounting has several advantages over the polar mount for solar tracking purposes. Unlike the polar mount, when the solar array is pointing east toward the morning sun, or west toward the evening sun, the bottom edge of a typical rectangular energy collection array is always parallel to the horizon. Consequently, the device can be considerably lower in height than a corresponding polar mount device. This leads to a device in which wind load stresses are reduced. Further, the structural members are usually in compression rather than cantilevered stress as is found in a polar mount, which results in a distinct advantage in construction costs for material required in a given size application. Also, its structural shape permits it to be more easily placed on a flat building roof than a corresponding polar mounting apparatus.

However, the primary disadvantage of the altazimuth mounting severely compromises the foregoing advantages, because it provides a significant problem in driving the axes of the mount to follow the sun. The mount must be continually driven on both the elevation and azimuth axes at a nonuniform rate in order to accurately track the sun. Early in the morning the tracking motion is largely elevational with very little azimuth travel. Elevation motion decreases to zero when the sun crosses the prime meridian at high noon, at which time the motion is entirely azimuthal. The reverse relative motions are repeated in the afternoon towards sunset, and the problem can be solved by only two methods. Both of these methods require a motor drive for each axis, which motors must be continually directed by either cybernetic, or computer stored azimuth and elevation positions, or some form of optical pointing device such as an electro optic sighting telescope which may be used to develop a motor error drive signal. The foregoing engineering problem includes the task of delivering the amplified elevation signal to the elevation motor, which frequently requires slip rings. This can be readily accomplished for a sophisticated and expensive device such as a radar missile tracker, but presents a prohibitive cost when it is desired to utilize the tracking device in a simple, inexpensive solar tracking system.

It is an object of the present invention to provide a low cost solar tracker in which, by purely mechanical coupling, a constant speed drive input can be resolved into two non-constant components of motion that will cause an altazimuth mount to precisely follow the sun. It is a further object to achieve the foregoing motion from a single, synchronous drive motor, and to avoid the requirement of both an elevation and an azimuth drive motor and the consequent electronic or electro optical feedback system for developing motor error drive signals. It is yet another object of the invention to provide such a low cost solar tracking system which is of relatively simple construction so as to permit maintenance and repair to be accomplished with relative ease.

SUMMARY OF THE INVENTION

The foregoing objects of the invention are accomplished in an apparatus which has a support axis member aligned along local vertical and which has attached thereto a movable polar axis member aligned along a polar axis which is co-linear with the earth's celestial pole axis and which intersects the local vertical axis of the support axis member. A rotatable shaft member is axially centered at the intersection of the polar axis and support member axis and is pivotable in a horizontal plane about this intersection. A sector arm is attached to the polar axis member and is axially rotatable with the polar axis member, the sector arm having a curved portion which is rotatable over a spherical surface about the intersecting point of the polar axis and support member vertical axis. A pointing spindle is rigidly attached to the rotatable shaft member at the axial intersection point and is movably attached to the sector arm. A constant speed drive motor is mechanically coupled to the polar axis member for rotating the polar axis member about its axis, and the pointing spindle is initially adjustably positioned to point toward the sun, and thereafter the constant speed drive motor will position the apparatus so as to maintain the pointing member direction toward the sun, and further will cause a solar energy collection device attached to the rotatable shaft member to pivot and rotate in synchronism with the relative movement of the sun across the earth's sky.

BRIEF DESCRIPTION OF THE DRAWINGS

A preferred embodiment of the present invention is described herein, and with reference to the appended drawings, in which:

FIG. 2A illustrates the position of the apparatus during sunrise of the summer solstice; and FIG. 2B illustrates the position of the apparatus at noon of the summer solstice; and FIG. 2C illustrates the position of the apparatus during sunset of the summer solstice; and FIG. 3A illustrates the position of the apparatus at sunrise during vernal equinox; and FIG. 3B illustrates the position of the apparatus at noon during vernal equinox; and FIG. 3C illustrates the position of the device at sunset during vernal equinox; and FIG. 4A illustrates the position of the apparatus at sunrise during the winter solstice; and FIG. 4B illustrates the position of the apparatus at noon during the winter solstice; and FIG. 4C illustrates the position of the apparatus at sunset during the winter solstice.

DESCRIPTION OF THE PREFERRED EMBODIMENT

Figure 1:
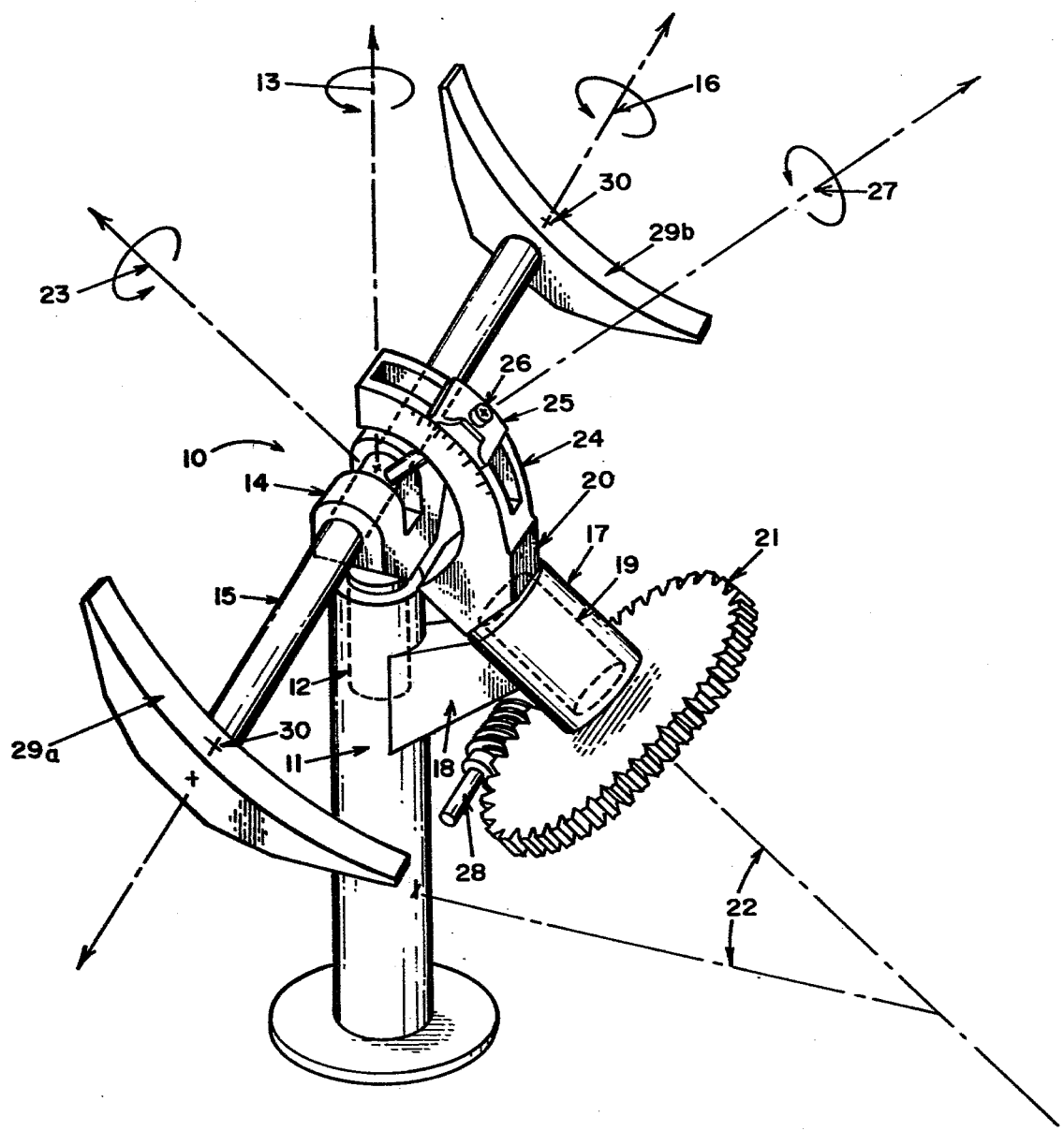
FIG. 1 is an isometric view of the apparatus having symbolically illustrated thereon a pair of solar collection devices.

Referring to the drawings, wherein like reference characters designate like or corresponding parts throughout the several views, there is shown in FIG. 1 a tracking mount generally designated 10 which embodies the principles of the instant invention.

The mount includes a pedestal 11 formed of suitable construction material and supported by an appropriate footing, not shown. Pedestal 11 serves to provide a support and bearing surface for a spindle 12. Spindle 12 is aligned to the zenith or local vertical, designated 13, at the particular terrestial location of the apparatus. Hereinafter axis 13 will be referred to as the azimuth axis. Spindle 12 is rigidly coupled to a yoke 14 which provides bearing surfaces for a shaft 15 which is maintained both orthogonal and co-planar with spindle 12. Shaft 15 is therefore always positioned in a horizontal plane orthogonal to axis 13. The axis of shaft 15 is designated as 16, and will hereinafter be referred to as the elevation axis 16.

A housing 17 is rigidly attached to pedestal 11 by an arm 18. A polar axis spindle 19 is supported within housing 17 on a suitable bearing surface, and spindle 19 is aligned along an axis designated as 23, which will hereinafter be referred to as the polar axis 23. Although arm 18 is shown in the preferred embodiment as a rigid extension from pedestal 11, alternative embodiments may be constructed wherein arm 18 is adjustably positioned so as to permit polar alignment of axis 23. This adjustability is required if the apparatus is to be operated at variable locations on the earth's temperate zones, for it is necessary that arm 18 be preselected for a given latitude such that axis 23 is aligned co-linear with the earth's spin axis.

Rigidly attached to polar spindle 19 is a circular sector arm 20, and an input drive gear 21. The rotational axis of spindle 19, as has hereinbefore been stated, is located to point at the earth's celestial pole along axis 23. Concurrent with the alignment of polar axis 23 to the earth's celestial pole is the requirement that polar axis 23 intercept azimuth axis 13 and elevation axis 16 at a common point. Stated another way, spindle 19 is inclined in a north-south plane at an angle equal to the latitude of the apparatus measured from the horizontal, angle 22 in FIG. 1, and the polar axis 23 of spindle 19 must be coincident with the intercept of axes 13 and 16.

Circular sector arm 20 has a datum surface 24 which contacts against a complementary shaped bearing block 25. A pointing spindle 26 is supported by bearing block 25 at one of its ends and is rigidly attached at its other end to shaft 15. The point of attachment between shaft 15 and pointing spindle 26 is the point of intersection of azimuth axes 13, elevation axis 16, and polar axis 23. Pointing spindle 26 is aligned along an axis, designated 27, which shall hereinafter be referred to as the pointing axis 27. Pointing axis 27 defines the pointing direction of the apparatus at all times as it follows a celestial body, or in the case of the preferred embodiment as a solar tracking device, pointing axis 27 defines the pointing direction to the sun. Pointing axis 27 is co-planar with polar axis 23 and intersects the common intersecting point of axes 13, 16 and 23.

The specific structural shape of bearing block 25 and surface 24 may be modified in many particulars. It is desired that bearing block 25 be adjustable along a circular path, in the plane defined by polar axis 23 and pointing axis 27, at a fixed radial distance from the common intercept point of axes 13, 16, 23 and 27. The angular adjustability of bearing block 25 should be such that pointing axis 27 may be positioned from an orthogonal position relative to axis 23 in either angular direction by at least 23½ degrees. This adjustment parameter permits the apparatus to track the sun's movement during any day of the year. Stated another way, the angular position of bearing block 25 shall be located on sector arm 20 and thereat fixed in angular location orthogonal to axis 23 at the spring and fall equinox, and for each day thereafter shall angularly depart according to the current daily declination of the sun.

The edge of bearing block 25 and sector arm 20 may be scribed with angular index marks as shown in FIG. 1, which marks may correspond to respective declination angles for proper sliding adjustment of bearing block 25 over datum surface 24 at any particular day of the year. Alternatively, in a more sophisticated and automatic embodiment of the invention, appropriate drive mechanisms may be connected to automatically slide bearing block 25 over datum surface 24 in timed relationship with the days of the year. Thus, beginning at the summer solstice, bearing block 25 is positioned relatively toward axis 13 for a high angle of declination. The manual or automatic movement of bearing block 25 along datum surface 24 away from azimuth axis 13 progresses incrementally corresponding with successive decreases in declination during succeeding days. This movement continues until the autumnal equinox, at which time bearing block 25 is centered along datum surface 24. Thereafter, the movement of bearing block 25 continues through lower declination angles until the winter solstice arrives. This relative movement of bearing block 25 relative to datum surface 24 could easily be timed in correspondence with the days of the year, for the relative change of the angle of declination of the sun is a predictably changing function with time.

Worm 28 is in drive connection with input drive gear 21, and provides the drive necessary when connected to a suitable constant speed motor (not shown). Worm 28 therefore causes polar spindle 19 to rotate in opposite synchronism of the rotation of the earth with respect to a celestial body, preferably the sun. For a solar tracker, polar spindle 19 is driven by gears 21 and 28 at the rate of one revolution per solar day, or one fourth degree per minute.

Shaft 15 serves to carry the useful payload, for example, solar energy collectors 29, which the invention is intended to direct. Solar energy collectors 29 are shown symbolically as a narrow section of a parabolic trough which is typical of such devices used as energy concentrators in solar energy collection systems. However, the specific shape and type of payload connected to shaft 15 is a matter of design choice and does not form a part of the present invention. The significant and illustrative purpose of showing solar energy collectors 29 is to demonstrate that, by fixedly attaching such units to shaft 15 as illustrated in the figures, it is demonstrated that such a solar energy collector may be attached for maximally collecting energy by controllably pointing directly at the sun during all times of the day.

FIG. 2A–FIG. 4C are illustrations taken from the same viewpoint showing respective positions of the apparatus at various times of the year, where certain structural parts of the apparatus have been deleted for simplicity. FIG. 2A illustrates the position of the apparatus during sunrise of the summer solstice, wherein bearing block 25 is positioned relatively high along sector arm 20, corresponding to a relatively high declination angle of the sun at this date in the year. FIG. 2B illustrates the same relative position of bearing block 25 and sector arm 20 at noon of the same day. FIG. 2C illustrates the same relative positions of bearing block 25 and sector arm 20 at sunset of the same day. The relative positions of solar energy collectors 29a and 29b as well as their respective pointing directions, cause them to track and face the direct rays of the sun at all times during the day.

FIG. 3A illustrates the position of the apparatus at sunrise during either equinox, wherein bearing block 25 is half-way positioned along sector arm 20. FIGS. 3B and 3C correspondingly indicate the position of the apparatus at noon and sunset respectively of the same equinox day.

FIG. 4A illustrates the position of the apparatus at sunrise during the winter solstice, showing bearing block 25 to be lowly positioned along sector arm 20, because of the relatively low angle of declination of the sun during this period. FIG. 4B similarly shows the apparatus at noon of the same day, and FIG. 4C shows the apparatus at sunset of the same day.

In comparing the view of FIGS. 2A, 3A and 4A, it can be seen that the apparatus compensates for the change in azimuthal angle required by the different relative sunrise positions at these three times of the year, and all intermediate times. In all three cases, the pointing direction of solar energy collectors 29a and 29b is at the horizon, where the sun begins its rise into the sky.

A comparison of FIGS. 2B, 3B and 4B shows the positioning of the apparatus at noon for the respective different times of year, showing the pointing angle to vary with the relative maximum position of the sun during these times of year. The azimuthal angle corresponds to the position of the sun centered in the sky relative to sunrise and sunset (prime meridian).

A comparison of FIGS. 2C, 3C and 4C similarly shows the apparatus pointing angle to be at the horizon sunset at three different times of year. The azimuth of the horizon sunset point naturally varies at these three different times and all intermediate times, and the apparatus automatically adjusts and tracks to this point.

In operation, a certain preliminary alignment and set up procedure is followed in order that the invention may function properly. Azimuth axis 13 is adjusted along local vertical and polar axis 23 is adjusted in alignment with the earth's celestial pole. The position of pointing axis 27, as defined by pointing spindle 26, is adjusted by moving bearing block 25 along datum surface 24 to correspond to the declination angle of the sun. Input drive gear 21 is rotated to drive polar spindle 19 and sector arm 20 to cause pointing axis 27 to intersect the sun.

Once the foregoing alignment procedure has been accomplished a constant drive motion is applied via worm gear 28 to input drive gear 21, at the rate of one revolution per solar day, to thereby cause polar spindle 19 to slowly turn and cause rotation of sector arm 20. Since pointing spindle 26 is attached to sector arm 20 spindle 26 will follow the movement of sector arm 20, and the attachment of spindle 26 to shaft 15 will cause spindle 12 to rotate about axis 13. Also, the attachment of pointing spindle 26 to shaft 15 will cause shaft 15 to rotate about axis 16. Since solar energy collectors 29 are attached to shaft 15 which is pivotal about spindle 12, they will correspondingly turn about axes 13 and 16 in a manner which will cause them to point directly at the sun as it moves across the sky.

The foregoing description illustrates that the apparatus of this invention can employ simple, constant speed rotary motion of one revolution per solar day derived from a motor or other synchronizing drive means to thereby produce a non-linear component of rotation to the elevation and azimuth axes 16 and 13 and thereby follow the sun about horizontal and vertical axes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for tracking the relative position of the sun from a location latitudinally and longitudinally fixed within the earth's temperate zones, comprising
   (a) a base having a support axis member affixed thereto;
   (b) means for aligning said support axis member along a first line which is vertical relative to the center of the earth;
   (c) a movable polar axis member attached to said base;
   (d) means for aligning said polar axis member in parallel relationship to the earth's celestial pole and along a second line passing through said first line;
   (e) a rotatable shaft member having its axis of rotation passing through the intersection of said first and second lines, said shaft member being pivotable in a horizontal plane about said intersection;
   (f) a sector arm attached to said polar axis member and axially rotatable therewith, said sector arm having a curved portion defined by a constant radius from the point of intersection of said first and second lines;

(g) a pointing spindle rigidly attached to said rotatable shaft member in radial alignment from said intersection of said first and second lines, and movably connected to said sector arm curved portion;

(h) constant speed drive means, coupled to said polar axis member, for turning said polar axis member about said second line; whereby said turning movement of the polar axis member is transformed through the sector arm and pointing spindle to cause the rotatable shaft member to pivot and rotate in synchronism with the relative movement of the sun.

2. The apparatus of claim 1, wherein said sector arm further comprises a surface displaced along a constant radius relative to said intersection of said first and second lines.

3. The apparatus of claim 2, further comprising locking means, slidable along said surface and attached to said pointing spindle, for selectively moving said pointing spindle.

4. The apparatus of claim 3, wherein said locking means further comprises a bearing block.

5. The apparatus of claim 4, further comprising energy collection means, attached to said rotatable shaft member, for collecting radiant energy from the sun.

6. The apparatus of claim 1, wherein said constant speed drive means further comprises a motor drive mechanism having an output turning rate of one revolution per day.

7. The apparatus of claim 6, wherein said motor drive mechanism further comprises an electric motor coupled to a worm gear rotational speed reducer.

8. A coordinate transformation apparatus for transforming a constant angular input drive motion from an input drive into an output drive motion for tracking the position of the sun, from locations in the earth's temperate zones, comprising:

an output member;

means mounting said output member for pivotal movement, about a first vertical axis and a second and intersecting horizontal axis; a driven member carried by said output member and defining a third axis intersecting said horizontal axis at a right angle at the point of intersection of said horizontal and vertical axes;

a driving member coupled to said input drive; means mounting said driving member for rotation about a fourth axis passing through said point of intersection and parallel with the earth's celestial pole axis; and means interconnecting said driven member for pivotal movement about said point of intersection and said driving member for pivotal movement about said driving member axis of rotation; whereby said driving member constant angular rotation is transformed to direct said output member to track the relative position of the sun from sunrise to sunset.

9. The apparatus of claim 8, further comprising means for selectively adjusting said means interconnecting said driven member and said driving member.

10. The apparatus of claim 9, wherein said means for selectively adjusting further comprises a locking member movable over a fixed radius from said point of intersection.

11. A coordinate transformation apparatus for transforming a constant angular input drive motion into an output drive motion for tracking the movement of the sun through diurnal angles, comprising (a) a driving member coupled to receive said constant angular input drive motion, said driving member having an axis of rotation parallel to the earth's celestial pole axis;

(b) an output member mounted on a horizontal shaft, the axis of said shaft intersecting the driving member axis of rotation;

(c) bearing means coupled to said shaft for permitting freedom of shaft movement in a horizontal plane and for permitting freedom of shaft rotation about its axis;

(d) a coupling member fixedly and perpendicularly attached to said shaft and attached to said driving member; whereby constant angular rotation of said driving member about its axis of rotation is transformed to position said output member about said shaft axis and in said horizontal plane to track the relative total daily movement of the sun.

12. The apparatus of claim 11, wherein said coupling member further comprises a member defining a constant radius from the point of intersection of said shaft axis and said driving member axis.

13. The apparatus of claim 12, wherein said coupling member radius is angularly adjustable about said shaft axis.

* * * * *